Patented Nov. 15, 1938

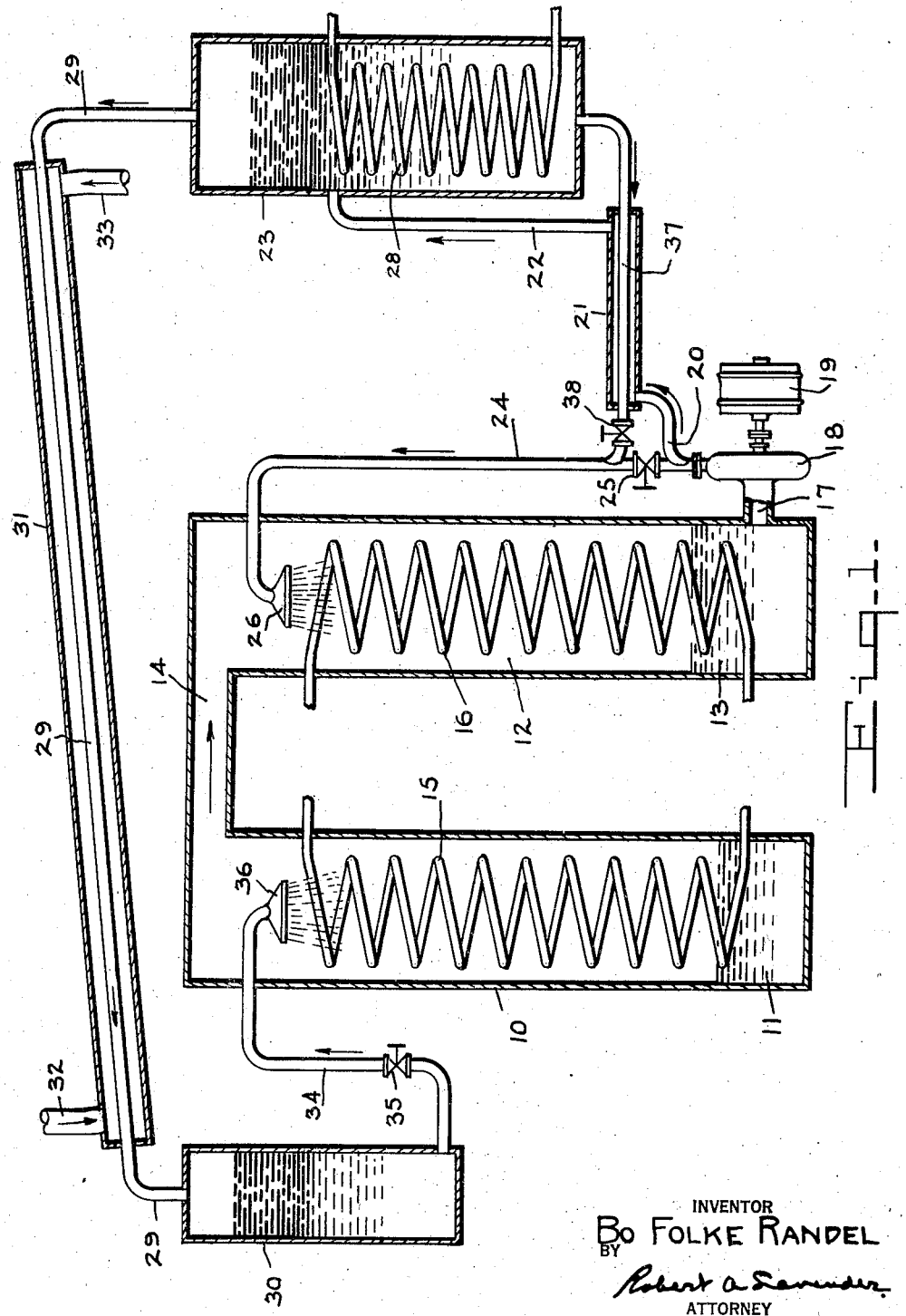

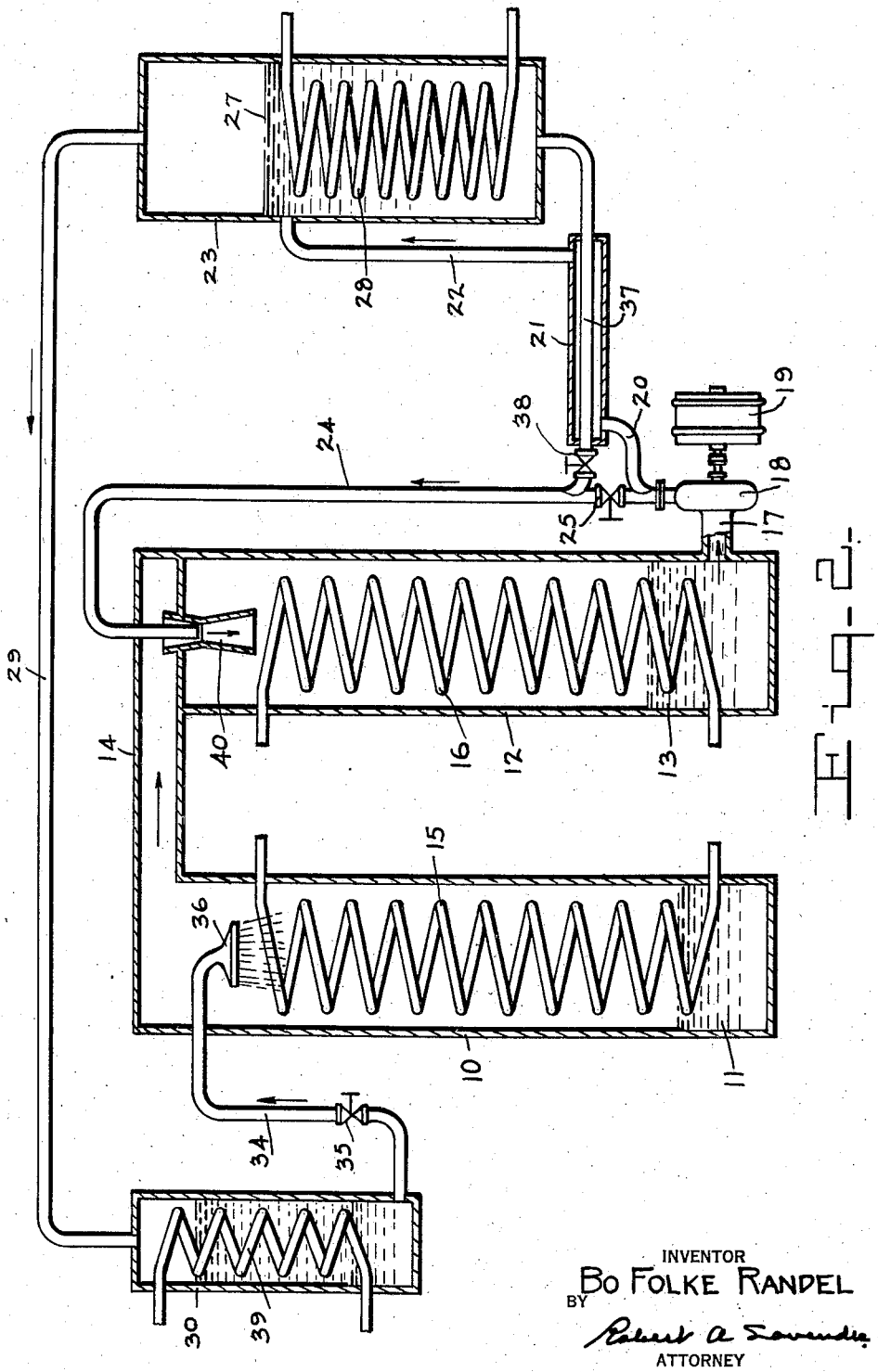

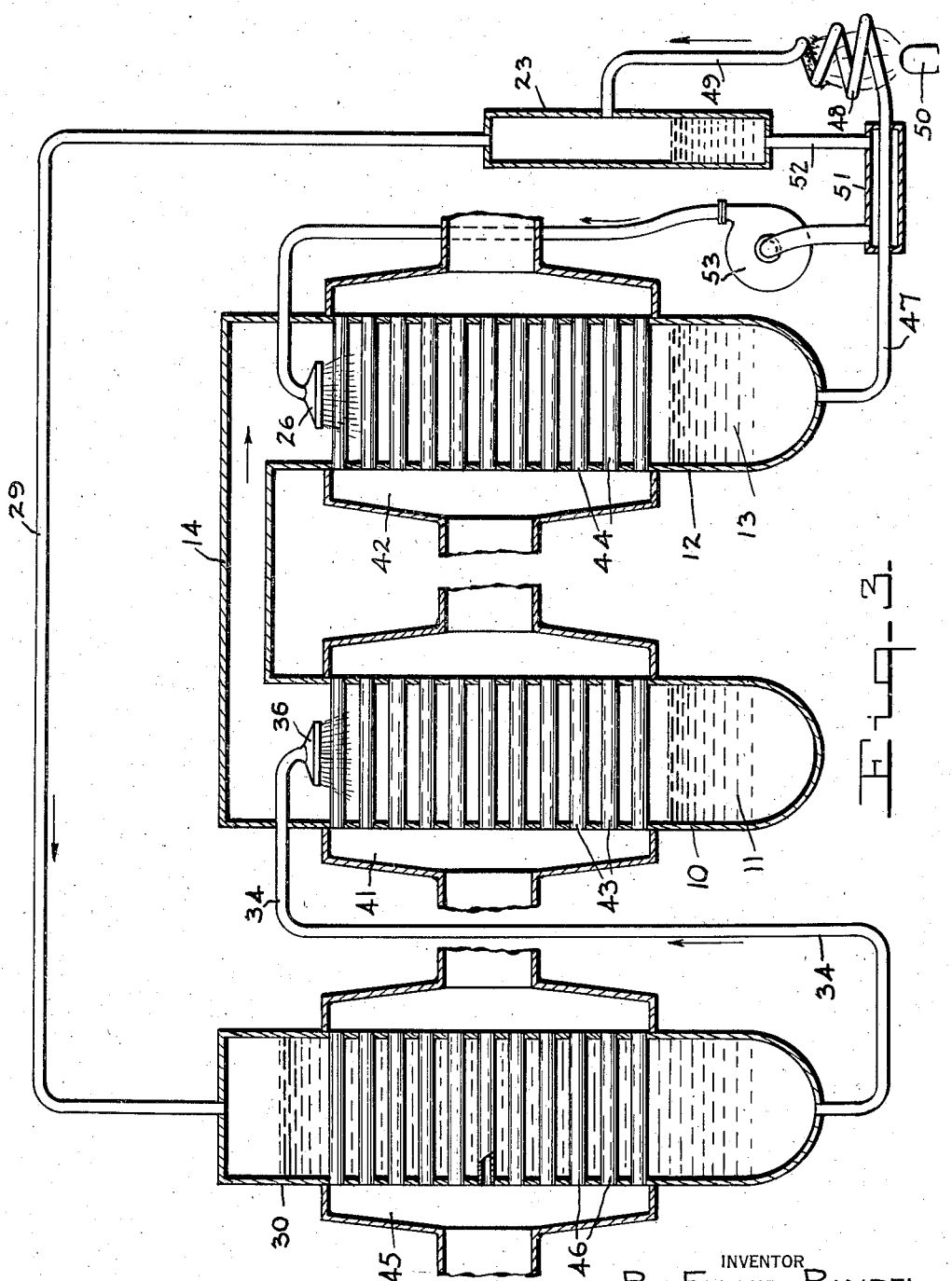

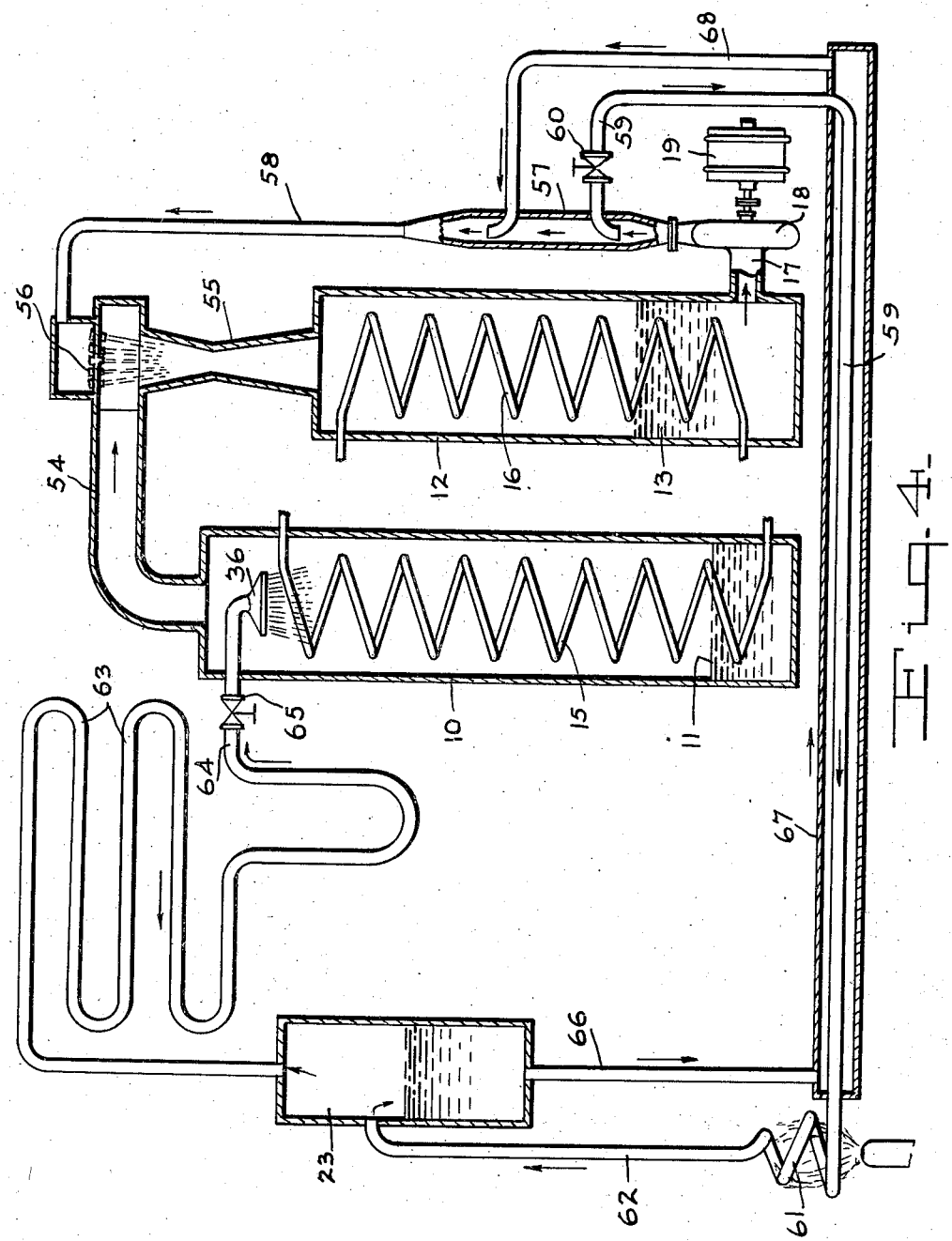

2,136,395

UNITED STATES PATENT OFFICE 2,136,395

APPARATUS FOR REFRIGERATION

Bo Folke Randel, San Diego, Calif.

Application March 9, 1936, Serial No. 67,867

3 Claims. (Cl. 62—119)

(Granted under the act of March 3, 1883, as amended April 30, 1928; 370 O. G. 757)

This invention relates to refrigeration and it has as a physical basis the fact that the vapor pressure of a solvent in a salt solution is lower than the vapor pressure of the pure solvent. For example, the vapor pressure of a solution of calcium chloride in water is lower than the vapor pressure of pure water.

The principal object of the present invention is the provision of a method of and apparatus for employing this physical law for the purpose of reducing the temperature of a refrigerating medium for circulation through a cooling system.

In its essentials the invention comprises two intercommunicating vessels, one an evaporator for containing a pure solvent and the other an absorber containing a solution of a salt in the solvent. Both vessels are preferably evacuated of air. Under these conditions the vapor pressure in the evaporator, being greater than that in the absorber, the vaporized solvent will flow from the former to the latter and will be absorbed by the solution therein. The evaporation of the solvent in the evaporator will be accompanied by the absorption of a certain amount of heat from the surrounding environment, such as a fluid employed for refrigerating or cooling purposes, and the absorption of the vapor in the absorber will be accompanied by the liberation of an equal amount of heat. If this evaporation and absorption should continue, the pure solvent in the evaporator would diminish in volume and also an excess quantity of solvent would accumulate in the absorber and dilute the solution therein. This tendency, however, is avoided by withdrawing some of the solution from the absorber and passing it to a generator where an amount of the pure solvent equal to that absorbed in the absorber is vaporized. This vaporized solvent is then condensed and returned to the evaporator and a certain amount of the concentrate solution is returned to the absorber, thus maintaining the volumes of the solvents in both of these vessels substantially constant. The solvent and solution returned to the evaporator and absorber are preferably sprayed thereinto so as to accelerate the rate of evaporation and absorption in these vessels. While many mediums can be employed for the purposes described, a solution of pure water and calcium chloride is used as an illustration in explaining the apparatus.

With these and other objects in view, as well as other advantages that may be incident to the use of the improvements, the invention consists in the parts and combinations thereof hereinafter set forth and claimed, and with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a diagrammatic view of a refrigerating apparatus embodying the present invention; and Figs. 2 to 4 inclusive, are similar views of other forms of refrigerating apparatus all embodying and operating in accordance with the invention.

Referring to the drawings, and particularly to Fig. 1 thereof, a refrigerating apparatus constructed and assembled in accordance with the invention is shown as comprising an evaporator 10 which is partly filled with a solvent 11 such as pure water, and an absorber 12 which is partly filled with a solution 13 such as calcium chloride and water. The evaporator 10 and absorber 12 are connected together at their upper ends by a pipe or conduit 14 and the assembly evacuated of air. A coil 15 through which a refrigerating medium is circulated is mounted within the evaporator 10 and a coil 16 through which a cooling medium is circulated is mounted within the absorber 12.

The evaporation of the water in the evaporator 10 and in the absorber 12 creates differential vapor pressures in these vessels such as will cause the vaporized water in the evaporator 10 to flow through the pipe 14 and into the absorber 12 where it is absorbed by the solution 13. The evaporation of the water in the evaporator 10 extracts heat from the coil 15 and the refrigerant flowing therethrough, which heat is liberated in the absorber 12 and is extracted therefrom through the cooling action of the coil 16.

By maintaining the temperature of the solution 13 in the absorber at substantially 85° F. and the solution at substantially 50 per cent water and 50 per cent calcium chloride, the vapor pressure in this vessel will correspond to about 7 mm. of Hg. This will therefore be the vapor pressure in the evaporator 10 and will correspond to approximately 42° F. A medium passing through the coil 15 may therefore be cooled to the theoretical point of this temperature, which is sufficiently low for most air or water cooling purposes.

If this evaporation and absorption were to continue, the water 11 in the evaporator would become depleted and the solution 13 in the absorber 12 would become diluted. In order, therefore, to maintain the volumes of water 11 and solution 13 substantially constant and to prevent the solution 13 from becoming diluted, an amount of the solution 13 equal to the amount of concentrated solution being supplied to the absorber plus the water absorbed thereby is withdrawn from the lower portion of the absorber 12 through a pipe 17 by means of a pump 18 driven by a motor 19, and forced through a pipe 20, a heat exchanger 21 and a pipe 22 into the upper portion of a generator 23. The pump 18 also communicates through a pipe 24, controlled by a valve 25, with a nozzle 26 located in the upper portion of the absorber 12. This nozzle sprays the solution downwardly over the cooling coil 16 and accelerates the rate of absorption of the water vapor.

The generator 23 also contains a quantity 27 of a solution of calcium chloride and water and is also provided with a coil 28 through which a heating medium, such as steam, is circulated. This coil heats the solution 27 in the generator 23 and the water vapor generated thereby passes through a pipe 29 communicating with a receiver tank 30. The pipe 29 is inclosed for a portion of its length within a water jacket 31 through which cooling water flows from an inlet pipe 32 to an outlet pipe 33. The cooling action of the water jacket condenses the water vapor and delivers it to the receiver 30 in a liquid state. From the receiver 30 the pure water passes through a pipe 34 controlled by a valve 35 to a nozzle 36 located in the upper portion of the evaporator 10 from which it is sprayed downwardly over the coil 15, thus not only accelerating the rate of evaporation and the extraction of heat from the refrigerant circulating through the coil 15 but maintaining the volume of water 11 in the evaporator 10 substantially constant.

The concentrated solution in the generator 23 is returned to the absorber 12 through a pipe 37 which communicates with the lower portion of the generator and with the pipe 24, and which is provided with a valve 38. The flow of the solution back to the absorber 12 is caused by the combined effect of the pump 18 forcing the solution which is withdrawn from the bottom of the absorber, through the pipe 24, and the difference in the hydrostatic heads of the solution in the absorber and generator. The pipe 37, for a portion of its length, passes through the heat exchanger 21 so that the heated solution flowing from the generator is cooled by the cold solution flowing from the absorber 12, this last mentioned solution being preheated by the heated solution flowing from the generator 23.

In Fig. 2 there is illustrated a slightly modified embodiment of the invention. In this particular construction the water jacket 31 is dispensed with and a cooling coil 39 provided within the receiver 30 for condensing the water vapor developed in the generator 23. Also, an ejector 40 is substituted for the spray nozzle 26 in the absorber 12. This ejector 40 not only delivers the solution to the absorber in atomized form but also accelerates the flow of water vapor from the evaporator 10 to the absorber 12.

In Fig. 3 there is shown a still further modified construction particularly adapted for reducing the temperature of the air of an air cooling system. In this construction the evaporator 10 and the absorber 12 are surrounded by jackets 41 and 42 respectively, through which air to be cooled by the evaporator, and cooling air for extracting heat from the absorber, are circulated. The cooling of the air flowing through the jacket 41 is facilitated by providing a plurality of pipes 43, which extend horizontally through the absorber from side to side in superposed spaced relation and through which the refrigerating air passes during its flow through the jacket 41. In a like manner the absorber 12 is provided with a plurality of transversely extending pipes 44, through which the cooling air flowing through the jacket 42 is adapted to pass, thus increasing the rate at which it extracts heat from the solution 13. The receiver 30 may also be constructed in a similar manner by providing a surrounding jacket 45 and transversely extending pipes 46, through which the cooling air is adapted to pass so as to accelerate the rate of condensation of the water vapor passing to this vessel.

Also, in this construction the lower portion of the absorber 12 communicates with the generator 23 through a pipe 47, heating coil 48, and pipe 49, the flow of the solution being affected by applying heat to the coil 48 from a suitable source 50. The concentrate solution is returned to the absorber 12 from the bottom of the generator 23, through a pipe 52 and a heat exchanger 51, the latter surrounding a portion of the pipe 47, and a pump 53, which communicates through a pipe with the nozzle 26 in the upper portion of the absorber 12. In other respects the operation of the apparatus is similar to that previously described in connection with Fig. 1.

In Fig. 4 there is illustrated a still further embodiment of the invention in which evaporator 10 communicates with the absorber 12 through a pipe 54 and a jet compressor including a Venturi tube 55 and spray nozzle 56. The pump 18 withdraws the solution from the lower portion of the absorber 12 through the pipe 17 and forces it through an ejector 57 and pipe 58 to the spray nozzle 56, from which it is projected through the Venturi tube 55 back into the absorber 12. A portion of the solution withdrawn from the absorber 12 is forced by the pump 18 into a pipe 59, the end of which projects into the ejector 57 and the flow therethrough is controlled by a valve 60. This portion of the solution flows through the pipe 59, a heating coil 61, where it is heated, and pipe 62 to the generator 23. The pure water vapor developed in the generator then passes through condenser coil 63, where it is liquefied, and thence through a pipe 64, controlled by a valve 65, to the spray nozzle 36 in the upper portion of the evaporator 10.

The heated concentrate solution is returned to the absorber through a pipe 66, heat exchanger 67 and pipe 68, the end of which projects into the ejector 57, and thence through the ejector 57 and pipe 58 to the spray nozzle 56. A portion of the pipe 59 extends through the heat exchanger 67 so that the cold solution withdrawn from the absorber 12 is preheated prior to passing through the heating coil 61, by the heated solution passing from the generator back to the absorber, this returning solution being in turn precooled by the solution passing through the pipe 59.

It will be apparent from the foregoing that all of the several modified constructions hereinabove described are basically the same and differ only in details of construction.

Other modifications and changes in proportion and arrangement of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

I claim:

1. A refrigerating apparatus comprising in combination: an evaporator containing a solvent; an absorber in vapor communication with said evaporator and containing a solution of a salt and a solvent, the evaporation of the solvent in the evaporator causing the absorption of heat from the surrounding medium and causing differential vapor pressures in the evaporator and the absorber and a flow of heated vaporized solvent from the former to the latter, the solvent in said absorber being adapted to absorb said vaporized solvent and extract heat therefrom; means within said evaporator through which a refrigerating medium is adapted to be circulated; means in said absorber for cooling said solvent; a generator for separating a volume of said solvent from said solution substantially equal to that absorbed thereby and returning it to said evaporator; and single means for withdrawing weak solution from said absorber and delivering the same to said generator and for also withdrawing concentrated solution from said generator and delivering the entire amount thereof to said absorber.

2. A refrigerating apparatus comprising in combination: an evaporator containing a solvent; an absorber in vapor communication with said evaporator and containing a solution of a salt and a solvent, the evaporation of the solvent in the evaporator causing the absorption of heat from the surrounding medium and causing differential vapor pressures in the evaporator and the absorber and a flow of heated vaporized solvent from the former to the latter, the solvent in said absorber being adapted to absorb said vaporized solvent and extract heat therefrom; means within said evaporator through which a refrigerating medium is adapted to be circulated; means in said absorber for cooling said solvent; a boiler for vaporizing a volume of said solvent from said solution substantially equal to that absorbed thereby condensing the same and returning it to said evaporator; and single means for withdrawing weak solution from said absorber and delivering a portion thereof back to said absorber and another portion thereof to said boiler and for also withdrawing concentrated solution from said boiler and delivering the entire amount thereof to said absorber commingled with the weak solution delivered thereto.

3. A refrigerating apparatus comprising in combination: an evaporator for containing a solvent; an absorber in vapor communication with said evaporator and containing a solution of a salt and a solvent, the evaporation of the solvent in the evaporator causing the absorption of heat from the surrounding medium and causing differential vapor pressures in the evaporator and the absorber and the flow of heated vaporized solvent from the former to the latter, the solvent in said absorber being adapted to absorb said vaporized solvent and extract heat therefrom; means within said evaporator through which a refrigerating medium is adapted to be passed; means in said absorber for cooling said solvent; a generator; means for conducting a volume of the solution from said absorber to said generator; means for heating the solution in said generator to vaporize the solvent therein; means for condensing said vaporized solvent and returning it to said evaporator; and means including an ejector nozzle for returning the concentrate solution from said generator to said absorber, thus to further decrease the vapor pressure in said evaporator and to maintain the volumes of the solvent and the solution in said evaporator and said absorber substantially constant.

BO FOLKE RANDEL.